US012778095B2

(12) United States Patent
Kazazian

(10) Patent No.: US 12,778,095 B2
(45) Date of Patent: Nov. 3, 2026

(54) FLOATING SOFT SWIMBAIT DEVICE

(71) Applicant: Kaspar Kazazian, Glendale, CA (US)

(72) Inventor: Kaspar Kazazian, Glendale, CA (US)

( * ) Notice: Subject to any disclaimer, the term of this patent is extended or adjusted under 35 U.S.C. 154(b) by 0 days.

(21) Appl. No.: 19/305,932

(22) Filed: Aug. 21, 2025

(65) Prior Publication Data

US 2026/0107932 A1 Apr. 23, 2026

Related U.S. Application Data

(60) Provisional application No. 63/709,726, filed on Oct. 21, 2024.

(51) Int. Cl.
*A01K 85/00* (2006.01)

(52) U.S. Cl.
CPC ...... *A01K 85/1821* (2022.02); *A01K 85/1837* (2022.02)

(58) Field of Classification Search
CPC .............. A01K 85/1821–1841; A01K 85/1847
USPC .... 43/42, 42.09, 42.22, 42.24, 42.26, 42.27, 43/42.28, 42.3, 42.35, 42.36, 42.37, 42.39
See application file for complete search history.

(56) References Cited

U.S. PATENT DOCUMENTS 3,465,466 A * 9/1969 Showalter .............. A01K 83/06 43/44.8
3,861,073 A * 1/1975 Thomassin ............ A01K 85/16 D22/127
4,158,927 A * 6/1979 Capra .................. A01K 85/005 D22/127
4,214,396 A * 7/1980 Firmin .................. A01K 85/00 D22/127
4,214,397 A * 7/1980 Kent ...................... A01K 85/00 43/42.35
4,219,956 A * 9/1980 Hedman ................ A01K 85/00 D22/127
4,317,305 A * 3/1982 Firmin .................. A01K 85/16 43/42.26
D263,988 S * 4/1982 Williams, Jr. ............... D22/133
4,414,772 A 11/1983 Duncan
4,744,168 A * 5/1988 Mcclellan .............. A01K 85/00 43/42.24
4,887,377 A * 12/1989 Morris .................. A01K 85/00 43/42.24
5,193,299 A * 3/1993 Correll .................. A01K 85/00 43/42.47
5,209,008 A * 5/1993 Kasznica ............... A01K 85/08 43/42.27
5,335,442 A * 8/1994 Ahlsten .................. A01K 85/08 43/26.2

(Continued)

FOREIGN PATENT DOCUMENTS

ES 2766878 A1 * 6/2020 ......... A01K 85/1833
JP 6666658 B2 3/2020

(Continued)

*Primary Examiner* — Morgan T Jordan
(74) *Attorney, Agent, or Firm* — Womble Bond Dickinson (US) LLP

(57) ABSTRACT

A soft floating fishing swimbait having a head section, a tail section and a body section, the body section comprising entirely closed cell foam and is positioned between the head section and the tail section, the head section and the tail section are entirely soft swimbait material including plastisol or silicone, and the swimbait further having a weight and a hook.

9 Claims, 3 Drawing Sheets

(56) References Cited

U.S. PATENT DOCUMENTS 5,465,523 A * 11/1995 Garst ..................... A01K 85/00 43/42.26
5,586,405 A * 12/1996 Fike ..................... A01K 85/16 43/42.31
5,806,234 A * 9/1998 Nichols ..................... A01K 85/00 43/42.39
5,894,693 A * 4/1999 Davie ..................... A01K 85/00 43/42.35
5,953,850 A * 9/1999 Hnizdor ..................... A01K 83/00 43/42.26
6,003,264 A * 12/1999 Hnizdor ..................... A01K 83/00 43/42.25
6,006,468 A * 12/1999 Hnizdor ..................... A01K 83/00 43/44.2
6,061,948 A * 5/2000 Boucek ..................... A01K 85/00 43/42.39
6,233,863 B1 * 5/2001 Dotson ..................... A01K 85/00 43/42.38
6,393,758 B1 * 5/2002 Sparkman ..................... A01K 85/08 43/42.25
6,678,992 B1 * 1/2004 Clark ..................... A01K 85/00 43/42.35
6,718,683 B2 * 4/2004 Hawkins ..................... A01K 85/00 43/42.38
6,843,017 B1 * 1/2005 Chambers, Sr. ..................... A01K 85/00 43/42.3
6,860,058 B2 * 3/2005 Ito ..................... A01K 85/00 43/42.31
7,076,911 B2 * 7/2006 Thorne ..................... A01K 85/00 43/42.26
7,080,476 B2 * 7/2006 King ..................... A01K 85/00 43/42.3
7,266,922 B2 * 9/2007 Oelerich, Jr. ..................... A01K 85/00 43/42.24
9,072,286 B1 * 7/2015 Rye ..................... A01K 85/14
12,382,939 B1 * 8/2025 Coniglio ..................... A01K 85/1821
2002/0188057 A1 * 12/2002 Chen ..................... C08L 53/00 43/42
2003/0074829 A1 * 4/2003 Brinkman ..................... A01K 85/00 43/42.36
2003/0196368 A1 * 10/2003 Ito ..................... A01K 85/00 43/42.24
2004/0049969 A1 * 3/2004 Rudolph ..................... A01K 85/16 43/42
2005/0120612 A1 * 6/2005 Chambers ..................... A01K 85/00 43/42.28
2005/0229474 A1 * 10/2005 Braaten ..................... A01K 85/14 43/42.49
2006/0037232 A1 * 2/2006 Gill ..................... A01K 85/00 43/44.8
2006/0042148 A1 * 3/2006 Bendel ..................... A01K 85/16 43/42.15
2006/0117643 A1 * 6/2006 Thorne ..................... A01K 85/00 43/42.39
2006/0218845 A1 * 10/2006 Moffitt ..................... A01K 85/005 43/43.15
2007/0033857 A1 * 2/2007 Myers ..................... A01K 93/00 43/41
2009/0056196 A1 * 3/2009 Korteweg ..................... A01K 85/01 43/42.24
2009/0119971 A1 * 5/2009 Miyasato ..................... A01K 85/00 43/42.24
2009/0265975 A1 * 10/2009 Gibson ..................... A01K 85/00 43/42.24
2010/0050497 A1 3/2010 Brown
2010/0115822 A1 5/2010 Huddleston
2010/0218413 A1 * 9/2010 Simmons ..................... A01K 85/00 43/42.31
2011/0214332 A1 * 9/2011 Partridge ..................... A01K 85/16 43/42.35
2012/0079757 A1 * 4/2012 Rye ..................... A01K 85/01 43/42.32
2017/0215397 A1 * 8/2017 Valtanen ..................... A01K 83/02
2022/0174923 A1 * 6/2022 DiModica ..................... A01K 85/1847
2022/0240492 A1 * 8/2022 Boldt ..................... A01K 85/1833
2022/0256824 A1 * 8/2022 Parks ..................... A01K 83/06
2023/0210098 A1 * 7/2023 Phillips ..................... A01K 85/018 43/42.06
2023/0210099 A1 * 7/2023 Pierce ..................... A01K 83/06 43/42.24
2023/0240275 A1 * 8/2023 Prero ..................... A01K 85/1837 43/42.19
2023/0263144 A1 * 8/2023 Bogan ..................... A01K 85/028 43/34
2024/0196876 A1 * 6/2024 Shimazaki ..................... A01K 85/01
2025/0248381 A1 * 8/2025 Morris ..................... A01K 85/16
2025/0359538 A1 * 11/2025 Mayer ..................... A01K 85/1811
2025/0374902 A1 * 12/2025 Navarro ..................... A01K 85/1831

FOREIGN PATENT DOCUMENTS

KR 20210000500 U * 3/2021 ..................... A01K 85/1841
KR 20220019364 A * 2/2022 ..................... A01K 85/02
KR 20220022746 A * 2/2022 ..................... A01K 83/00
WO WO-2024194478 A1 * 9/2024 ..................... A01K 85/1897
WO WO-2025015387 A1 * 1/2025 ..................... A01K 85/01

* cited by examiner

FLOATING SOFT SWIMBAIT DEVICE

CROSS-REFERENCE TO RELATED APPLICATION

This application claims the benefit of and priority to U.S. Provisional Application No. 63/709,726, filed on Oct. 21, 2024, the content of which is incorporated herein by reference in its entirety.

BACKGROUND OF THE INVENTION

Fishing lures have been manufactured for years of soft plastic material in an attempt to replicate the swimming motion of live bait to various degrees of success. Previous lures did not incorporate closed cell foam as a complete component of the lure and therefore suffered from buoyancy restrictions. One prior lure design incorporated a small portion of foam internally within the body section and included a main body formed from a soft synthetic resin molded into a live bait shape and a weight for stabilizing the posture of the main body, wherein the weight was made from a soft foaming agent for giving buoyancy to the inside. Because the weight was positioned totally within a portion of the main body, buoyancy was only very marginally improved and cast distance was limited. Consequently, a need exists for an improved floating swimbait that addresses the drawbacks of prior lures.

SUMMARY

The invention is directed to a fishing lure, and more particularly to a floating soft swimbait. The swimbait comprises a head section, a tail section and a body section wherein at least one of the sections comprises closed cell foam. Preferably the full body section is made of closed cell foam.

One advantage of a swimbait having full body closed-cell foam design, versus the a design of a smaller foam buried in resin, is drastically higher buoyancy. The swimbait of the present invention is able to achieve at least triple the foam volume versus the prior designs, leading to far higher buoyancy and cast distance, which is the desired effect. In prior lures, the enclosed foam only plays a small part in its functionality. In the present invention, the full body foam is the central to improved performance. During prototype testing, due to the required wall thickness of the non-buoyant resin in prior lures, gains in buoyancy were found to be marginal. In contrast, a full body foam design using a 1 oz overall weight, achieves a 60% increase in cast distance compared to a similarly buoyant standard swimbait rigged ⅜ oz. In contrast, the maximum possible cast distance increase with the enclosed foam of prior lure designs was found to be only 20% during testing. With a full body foam design, the drastically improved cast distance (while maintaining desired buoyancy) is a huge benefit for any shore-based fishing, leading to many more fish being caught.

In terms of benefits to action of the swimbait, the floating swimbait design of the present invention offers several advantages to the less buoyant prior swimbait design and standard swimbait design. First, when rigged Texas rig, as shown in the drawings, the floating swimbait always stays at least several inches off the bottom of the ocean floor, as the tungsten bullet weight separates from the float bait and hits the ocean bottom. As such, the floating swimbait is always in the strike zone just off the bottom. A standard swimbait rigged Texas rig will eventually fall to the bottom and out of the strike zone. The swimbait design with a built-in weight cannot be rigged "Texas rig" style and will also fall to the bottom. With the floating swimbait of the present invention, the longer time in the strike zone leads to more fish being caught.

Second, it is unprecedented for a swimbait to achieve paddle tail motion while being dragged on the bottom, but the floating swimbait of the present invention achieves this. Even if the floating swimbait is rigged so the 1 oz weight is fully pinned to it (and will fall to the bottom as one piece), its full body buoyant foam design ensures the tail will always be just off the bottom and maintaining paddle-tail side to side motion. Due to the high buoyancy of the full-body foam, the tail is always off the bottom while the weighted front is on the bottom, leading to more bites. In contrast, the prior designs are not capable of maintaining paddle tail motion while the swimbait is being dragged on the bottom.

BRIEF DESCRIPTION OF THE DRAWINGS

The above and other aspects, features, and enhancements of certain embodiments of the disclosure will be more apparent from the following description taken in conjunction with the accompanying drawings, in which.

DETAILED DESCRIPTION

Figure 1:
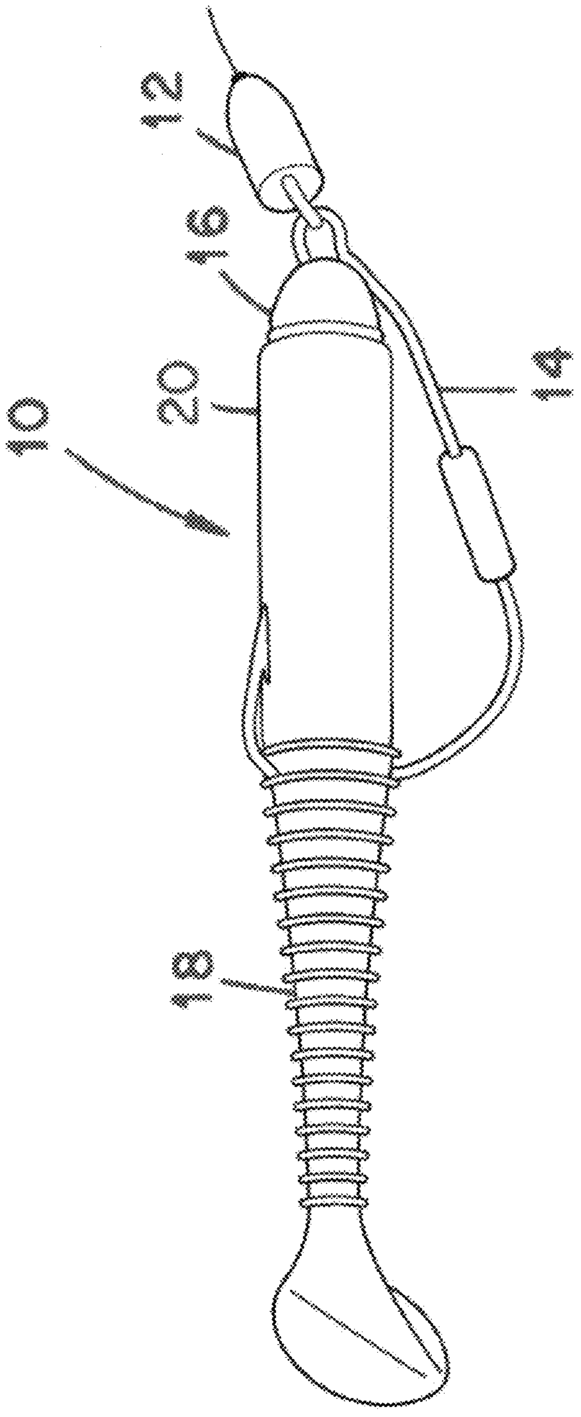
FIG. 1 is a perspective side view of the floating swimbait device according to an embodiment.

FIG. 1 illustrates a floating swimbait 10 of the present invention rigged "Texas rig" style with a sliding black ¾ oz. tungsten bullet weight 12 and a weedless offset worm hook 14 weighted ¼ oz. This is one example of hundreds of possible rigging configurations using the floating swimbait concept of the present invention with different weight/hook styles and sizes chosen for the desired weed lessness, buoyancy, and action. FIG. 1 is just one example. The swimbait 10 comprises a head section 16, a tail section 18 and a body section 20 wherein at least one of the sections comprises closed cell foam. Preferably the full body section 20 is made of closed cell foam.

Figure 2:
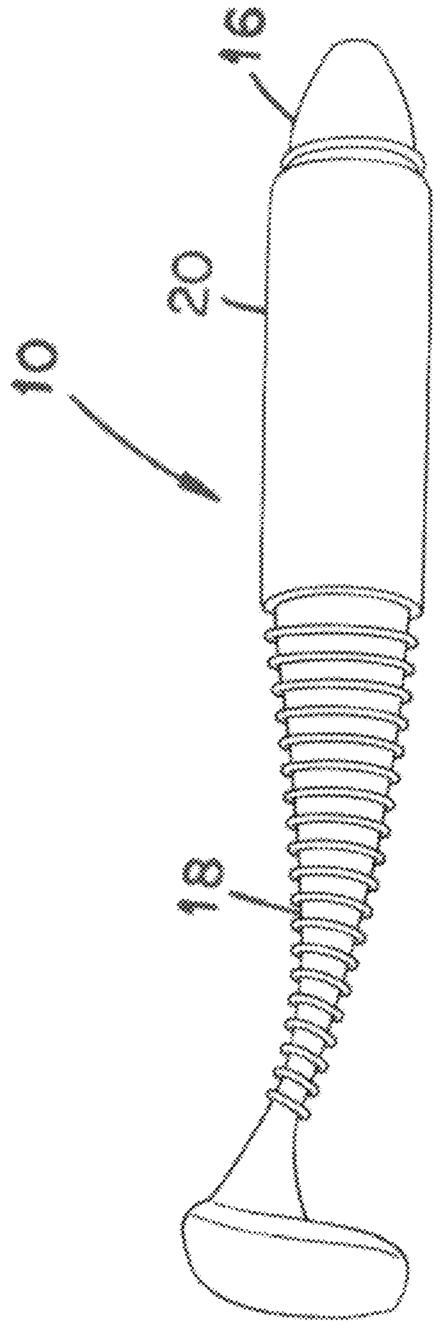
FIG. 2 is an angled side view of the floating swimbait device according to an embodiment.
Figure 3:
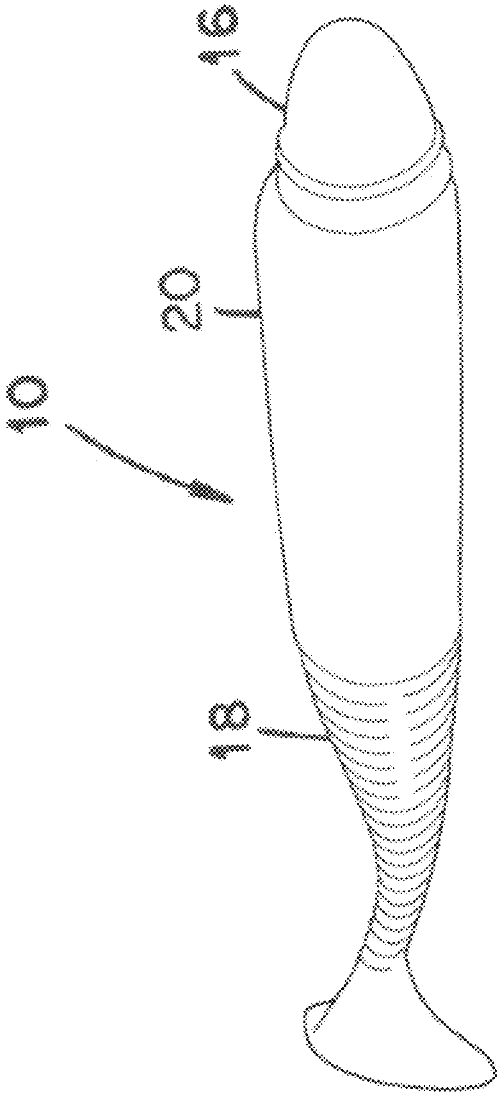
FIG. 3 is an isometric view for the floating swimbait device according to an embodiment.

FIGS. 2 and 3 illustrate different angles of the floating soft swimbait 10 of FIG. 1. The floating swimbait is designed to be used by fishermen, in place of standard soft swimbaits that are less buoyant. There are multiple ways to manufacture such a swimbait, but the basic principle applies for all of them. The body section of a standard soft plastisol swimbait is replaced by a buoyant closed cell foam.

The soft plastisol head section 16 and tail section 18 can be attached to the closed cell foam body section 20 through any number of methods (adhesives, heating, etc). The diameter and length of the closed cell foam body section 20 can be modified for desired buoyancy. The soft plastisol head section 16 facilitates attachment to a variety of swimbait hooks 14. The soft plastisol tail section 18 provides excellent swimming action at slow retrieve speeds.

There is currently no swimbait available that is comprised of closed cell foam material combined with soft plastisol material. The floating swimbait has exceptional buoyancy, which has advantages for catching fish in many applications.

The soft floating swimbait can be made in any color or length. The floating swimbait design shown utilizes a tail 18 in the style of a paddle tail, but any tail style can be utilized (curly tail, paddle tail, etc.). Again, the defining feature of the of the swimbait is a closed cell foam used in conjunction with typical soft swimbait material like plastisol. Plastisol may be replaced by a similar plastic such as silicone, with no change in the functionality of the floating swimbait.

The present invention has been disclosed and described with respect to an embodiment thereof, however, changes and modifications can be made therein which are intended to be within the scope of the invention as claimed herein.

What is claimed is:

1. A floating fishing swimbait consisting of:

a head section consisting of entirely soft material;

a tail section; and a body section consisting of entirely closed cell foam; wherein the body section is positioned between and connected to the head section and the tail section.

2. The swimbait of claim 1 wherein the tail section is soft material.

3. The swimbait of claim 2 wherein the head section and the tail section is plastisol or silicone.

4. The swimbait of claim 1 further having a hook.

5. A floating fishing lure consisting of:

a head portion consisting of entirely of soft material;

a body portion consisting of entirely of foam attached on one end to the head portion; and a tail portion consisting of entirely soft material attached to an opposite end of the body portion.

6. The lure of claim 5 further including a hook.

7. The lure of claim 5 wherein the head portion and the tail portion is plastisol or silicone.

8. A floating soft swimbait device consisting of an entirely plastisol head attached to a closed cell body and a plastisol tail attached to the body opposite from the head.

9. The device of claim 8 further including a hook.

* * * * *